350-471    SR   3 N    Search Room
OR   2,416,032

Feb. 18, 1947.         A. WARMISHAM ET AL         2,416,032
                         OPTICAL OBJECTIVE
                        Filed June 12, 1943

T2305

*Certain elements are non-glass.*

FIG. 1.

| R1 | R2 | R3 | R4 | R5 | R6 | R7 | R8 | R9 | R10 |
|---|---|---|---|---|---|---|---|---|---|
| +.7356 | +1.6278 | +.3455 | +.5448 | +.2607 | −.3637 | −1.0722 | −.4966 | +6.5113 | −1.0335 |

| D1 | S1 | D2 | D3 | S2 | D4 | D5 | S3 | D6 |
|---|---|---|---|---|---|---|---|---|
| .0684 | .0049 | .0922 | .0195 | .1563 | .0195 | .1319 | .0049 | .0342 |

FIG. 2.

| R1 | R2 | R3 | R4 | R5 | R6 | R7 | R8 | R9 | R10 |
|---|---|---|---|---|---|---|---|---|---|
| +1.0058 | +8.333 | +.4237 | +.4237 | +.2730 | −.3127 | −.7010 | −.4268 | +2.130 | −1.247 |

| D1 | S1 | D2 | D3 | S2 | D4 | D5 | S3 | D6 |
|---|---|---|---|---|---|---|---|---|
| .0870 | 0 | .1474 | .0440 | .1960 | .0450 | .1603 | 0 | .1040 |

Inventors
A. WARMISHAM
By C. G. WYNNE
Attorneys

Patented Feb. 18, 1947

2,416,032

UNITED STATES PATENT OFFICE 2,416,032

OPTICAL OBJECTIVE

Arthur Warmisham and Charles Gorrie Wynne, Leicester, England

Application June 12, 1943, Serial No. 490,637
In Great Britain October 6, 1942

6 Claims. (Cl. 88—57)

This invention relates to an optical objective for photographic or other purposes of the kind corrected for spherical and chromatic aberrations, coma, astigmatism, field curvature and distortion, and comprising two compound divergent components located between two simple convergent components, each divergent component consisting of a divergent element made of a material having relatively low Abbé V number and compounded with a second element made of a material having relatively high Abbé V number, such second element usually (but not necessarily) being convergent.

In the objective according to the invention the materials used for the two divergent elements of low Abbé V number have mean refractive index between 1.62 and 1.68 and Abbé V number between 21.0 and 31.0, whilst those used for the other four elements have mean refractive index between 1.70 and 1.80 and Abbé V number greater than 50.0 and preferably less than 58.0. The material used for each of the two divergent elements preferably has mean refractive index at least .05 less than that of the material used for the element cemented to it.

Various combinations of materials may be employed and it is especially convenient to make each of the two divergent elements of an alkaline halide crystal. For example potassium iodide or sodium bromide crystal may be used for these divergent elements.

By choosing materials for all the elements having substantially the same relative partial dispersion, it is possible to obtain a much higher degree of correction for secondary spectrum than hitherto without sacrificing the corrections for astigmatism, field curvature and distortion. The relative partial dispersion, usually represented by the symbol $\theta$, may be defined by the mathematical expression $$\frac{n_g - n_e}{n_F - n_C}$$

where $n_C$, $n_e$, $n_F$ and $n_g$ are respectively the refractive indices for the spectrum lines C, e, F and g. Thus potassium iodide crystal and sodium bromide crystal respectively have relative partial dispersions .987 and .985, and good secondary spectrum correction can be obtained with the use of either of these crystals for the two divergent elements in conjunction with magnesium oxide crystal in the form known as $\beta$-magnesium-oxide for the four other elements, such crystal having relative partial dispersion .989.

The cemented surfaces in the two divergent components are preferably such that (regarding a cemented surface as having positive curvature if concave to the diaphragm and negative curvature if convex thereto) the algebraic sum of the curvatures of the two cemented surfaces is positive. When the overall axial length of the objective lies between .51 and .65 times the equivalent focal length of the objective, such algebraic sum preferably lies between 5.0 and 1.8 times the reciprocal of such equivalent focal length, whilst when the overall length is between .65 and .80 times the equivalent focal length, the algebraic sum preferably lies between 4.0 and 1.0 times the reciprocal of the equivalent focal length.

In the accompanying drawing,

Figures 1 and 2 respectively illustrate two convenient practical examples of objective according to the invention.

Numerical data for these two examples are given in the following tables, in which $R_1R_2$ ... represent the radii of curvature of the individual lens surfaces counting from the front (that is from the side of the longer conjugate) the positive sign indicating that the surface is convex to the front and the negative sign that it is concave thereto, $D_1D_2$ ... represent the axial thicknesses of the various elements, and $S_1S_2S_3$ the axial air separations between the components. The tables also give the mean refractive indices $n_D$ and the Abbé V numbers and also the relative partial dispersions of the materials of which the individual elements are made.

Example I

Equivalent focal length 1.000    Relative aperture F/2.0

| Radius | Thickness or air separation | Refractive index $n_D$ | Abbé V number | Relative partial dispersion |
|---|---|---|---|---|
| $R_1 +.7356$ | $D_1$  .0684 | 1.7378 | 53.5 | 0.989 |
| $R_2 +1.6278$ | $S_1$  .0049 | | | |
| $R_3 +.3455$ | $D_2$  .0922 | 1.7378 | 53.5 | .989 |
| $R_4 +.5448$ | $D_3$  .0195 | 1.641 | 29.9 | .985 |
| $R_5 +.2607$ | $S_2$  .1563 | | | |
| $R_6 -.3637$ | $D_4$  .0195 | 1.641 | 29.9 | .985 |
| $R_7 -1.0722$ | $D_5$  .1319 | 1.7378 | 53.5 | .989 |
| $R_8 -.4966$ | $S_3$  .0049 | | | |
| $R_9 +6.5113$ | $D_6$  .0342 | 1.7378 | 53.5 | .989 |
| $R_{10} -1.0335$ | | | | |

Example II

Equivalent focal length 1.000    Relative aperture F/2.0

| Radius | Thickness or air separation | Refractive index $n_D$ | Abbé V number | Relative partial dispersion |
|---|---|---|---|---|
| $R_1 +1.0058$ | $D_1$  .0870 | 1.7378 | 53.5 | 0.989 |
| $R_2 +8.333$ | $S_1$  0.0 | | | |
| $R_3 +.4237$ | $D_2$  .1474 | 1.7378 | 53.5 | .989 |
| $R_4 +.4237$ | $D_3$  .0440 | 1.6634 | 21.4 | .987 |
| $R_5 +.2730$ | $S_2$  .1960 | | | |
| $R_6 -.3127$ | $D_4$  .0450 | 1.6634 | 21.4 | .987 |
| $R_7 -.7010$ | $D_5$  .1603 | 1.7378 | 53.5 | .989 |
| $R_8 -.4268$ | $S_3$  0.0 | | | |
| $R_9 +2.130$ | $D_6$  .1040 | 1.7378 | 53.5 | .989 |
| $R_{10} -1.247$ | | | | |

In each of these examples the two cemented surfaces $R_4$ and $R_7$ are both concave to the diaphragm. In Example I the curvatures of these two surfaces are respectively about 1.84 and 0.93 and the overall length of the objective is .5318, whilst in Example I the two curvatures are respectively about 2.36 and 1.43, the overall length being .7837.

The use of sodium bromide crystal in Example I or of potassium iodide crystal in Example II in conjunction with magnesium oxide crystal, for all the elements of the objective, has the important further advantage that the objective can be employed not only for visible light but also for a wide range of ultraviolet wavelengths down to 2000 Angstrom units. Since the relative partial dispersions of the alkaline halide crystals which may be used for the divergent components are slightly less than that of the magnesium oxide crystal of the convergent components, such crystal combinations give a small residual secondary spectrum which is the reverse of the usual shape, for the paraxial focussing distance thereby established for the central wavelength chosen for colour correction is a maximum and other wavelengths both longer and shorter, give smaller focussing distances. This is favourable for use with violet and ultraviolet rays, for as the wavelength decreases, the secondary spherical aberration becomes increasingly relatively over-corrected and the shortening of the paraxial focussing distance thus makes it possible to arrange a compromise such that the position of the focal plane can remain constant for all wavelengths with slightly softer definition for the shorter wavelengths.

It will be appreciated that the foregoing arrangements have been described by way of example only and that the invention can be carried into practice in other ways.

What we claim as our invention and desire to secure by Letters Patent is:

1. An optical objective, corrected for spherical and chromatic aberrations, coma, astigmatism, field curvature and distortion, and comprising two simple convergent components, and two compound divergent components located between the convergent components and each consisting of a divergent element made of a material having relatively low Abbé V number and compounded with a second element having relatively high Abbé V number, wherein the materials used for the two divergent elements have mean refractive index lying between 1.62 and 1.68 and Abbé V number lying between 21.0 and 31.0 whilst those used for the other four elements have mean refractive index lying between 1.70 and 1.80 and Abbé V number greater than 50.0, and in which the overall axial length of the objective lies between .51 and .65 times the equivalent focal length of the objective, and the algebraic sum of the curvatures of the cemented surfaces in the two divergent components (regarding such curvature as positive if the surface is concave to the diaphragm position and negative if the surface is convex thereto) is positive and lies between 5.0 and 1.8 times the reciprocal of such equivalent focal length.

2. An optical objective, corrected for spherical and chromatic aberrations, coma, astigmatism, field curvature and distortion, and comprising two simple convergent components made of magnesium oxide crystal, and two compound divergent components located between the two convergent components and each consisting of a divergent element made of sodium bromide crystal compounded with a second element made of magnesium oxide crystal, and in which the overall axial length of the objective lies between .51 and .65 times the equivalent focal length of the objective, and the algebraic sum of the curvatures of the cemented surfaces in the two divergent components (regarding such curvature as positive if the surface is concave to the diaphragm position and negative if the surface is convex thereto) is positive and lies between 5.0 and 1.8 times the reciprocal of such equivalent focal length.

3. An optical objective, corrected for spherical and chromatic aberrations, coma, astigmatism, field curvature and distortion, and comprising two simple convergent components, and two compound divergent components located between the convergent components and each consisting of a divergent element made of a material having relatively low Abbé V number and compounded with a second element having relatively high Abbé V number, wherein the materials used for the two divergent elements have mean refractive index lying between 1.62 and 1.68 and Abbé V number lying between 21.0 and 31.0 whilst those used for the other four elements have mean refractive index lying between 1.70 and 1.80 and Abbé V number greater than 50.0, and in which the overall axial length of the objective lies between .65 and .80 times the equivalent focal length of the objective, and the algebraic sum of the curvatures of the cemented surfaces in the two divergent components (regarding such curvature as positive if the surface is concave to the diaphragm position and negative if the surface is convex thereto) is positive and lies between 4.0 and 1.0 times the reciprocal of such equivalent focal length.

4. An optical objective, corrected for spherical and chromatic aberrations, coma, astigmatism, field curvature and distortion, and comprising two simple convergent components made of magnesium oxide crystal, and two compound divergent components located between the two convergent components and each consisting of a divergent element made of potassium iodide crystal compounded with a second element made of magnesium oxide crystal, and in which the overall axial length of the objective lies between .65 and .80 times the equivalent focal length of the objective, and the algebraic sum of the curvatures of the cemented surfaces in the two divergent components (regarding such curvature as positive if the surface is concave to the diaphragm position and negative if the surface is convex thereto) is positive and lies between 4.0 and 1.0 times the reciprocal of such equivalent focal length.

5. An optical objective having numerical data substantially as set forth in the following table:

Equivalent focal length 1.000    Relative aperture F/2.0

| Radius | Thickness or air separation | Refractive index $n_D$ | Abbé V number | Relative partial dispersion |
|---|---|---|---|---|
| $R_1+.7356$ | $D_1$ .0684 | 1.7378 | 53.5 | 0.989 |
| $R_2+1.6278$ | $S_1$ .0049 | | | |
| $R_3+.3455$ | $D_2$ .0922 | 1.7378 | 53.5 | .989 |
| $R_4+.5448$ | $D_3$ .0195 | 1.641 | 29.9 | .985 |
| $R_5+.2607$ | $S_2$ .1563 | | | |
| $R_6-.3637$ | $D_4$ .0195 | 1.641 | 29.9 | .985 |
| $R_7-1.0722$ | $D_5$ .1319 | 1.7378 | 53.5 | .989 |
| $R_8-.4966$ | $S_3$ .0049 | | | |
| $R_9+6.5113$ | $D_6$ .0342 | 1.7378 | 53.5 | .989 |
| $R_{10}-1.0335$ | | | | | in which $R_1$ $R_2$ . . . represent the radii of curvature of the individual lens surfaces counting from the front (that is from the side of the longer conjugate) the positive sign indicating that the surface is convex to the front and the negative sign that it is concave thereto, $D_1$ $D_2$ . . . represent the axial thicknesses of the various elements, and $S_1$ $S_2$ $S_3$ the axial air separations between the components.

6. An optical objective having numerical data substantially as set forth in the following table:

Equivalent focal length 1.000    Relative aperture F/2.0

| Radius | Thickness or air separation | Refractive index $n_D$ | Abbé V number | Relative partial dispersion |
|---|---|---|---|---|
| $R_1+1.0058$ | $D_1$ .0870 | 1.7378 | 53.5 | 0.989 |
| $R_2+8.333$ | $S_1$ 0.0 | | | |
| $R_3+.4237$ | $D_2$ .1474 | 1.7378 | 53.5 | .989 |
| $R_4+.4237$ | $D_3$ .0440 | 1.6634 | 21.4 | .987 |
| $R_5+.2730$ | $S_2$ .1960 | | | |
| $R_6-.3127$ | $D_4$ .0450 | 1.6634 | 21.4 | .987 |
| $R_7-.7010$ | $D_5$ .1603 | 1.7378 | 53.5 | .989 |
| $R_8-.4268$ | $S_3$ 0.0 | | | |
| $R_9+2.130$ | $D_6$ .1040 | 1.7378 | 53.5 | .989 |
| $R_{10}-1.247$ | | | | | in which $R_1$ $R_2$ . . . represent the radii of curvature of the individual lens surfaces counting from the front (that is from the side of the longer conjugate) the positive sign indicating that the surface is convex to the front and the negative sign that it is concave thereto, $D_1$ $D_2$ . . . represent the axial thicknesses of the various elements, and $S_1$ $S_2$ $S_3$ the axial air separations between the components.

ARTHUR WARMISHAM.
CHARLES GORRIE WYNNE.

REFERENCES CITED

The following references are of record in the file of this patent:

UNITED STATES PATENTS

| Number | Name | Date |
|---|---|---|
| 2,117,252 | Lee | May 10, 1938 |
| 2,252,681 | Aklin | Aug. 19, 1941 |
| 2,085,437 | Michelssen | June 29, 1937 |
| 1,541,407 | Spangenberg | June 9, 1925 |
| 1,955,591 | Lee | Apr. 17, 1934 |
| 2,194,413 | Warmisham et al. | Mar. 19, 1940 |
| 2,262,998 | Frederick et al. | Nov. 18, 1941 |
| 583,336 | Rudolph | May 25, 1897 |

FOREIGN PATENTS

| Number | Country | Date |
|---|---|---|
| 323,138 | British | Dec. 24, 1929 |